(12) United States Patent
Jonas et al.

(10) Patent No.: US 7,785,493 B2
(45) Date of Patent: Aug. 31, 2010

(54) POLYMER COATINGS HAVING IMPROVED RESISTANCE TO SOLVENTS

(75) Inventors: Friedrich Jonas, Aachen (DE); Udo Guntermann, Krefeld (DE)

(73) Assignee: H. C. Starck GmbH & Co. KG, Goslar (DE)

( * ) Notice: Subject to any disclaimer, the term of this patent is extended or adjusted under 35 U.S.C. 154(b) by 0 days.

(21) Appl. No.: 11/593,205

(22) Filed: Nov. 3, 2006

(65) Prior Publication Data

US 2007/0105991 A1 May 10, 2007

(30) Foreign Application Priority Data

Nov. 10, 2005 (DE) .................. 10 2005 053 646

(51) Int. Cl.
*H01B 1/00* (2006.01)
(52) U.S. Cl. .................................... 252/500
(58) Field of Classification Search .................. 252/500
See application file for complete search history.

(56) References Cited

U.S. PATENT DOCUMENTS

| 4,798,686 A | * | 1/1989 | Hocker et al. ............ 252/500 |
| 5,300,575 A | | 4/1994 | Jonas et al. |
| 5,370,981 A | | 12/1994 | Krafft et al. |
| 6,299,800 B1 | * | 10/2001 | Viswanathan ............ 252/500 |
| 6,376,105 B1 | | 4/2002 | Jonas et al. |
| 6,890,584 B2 | | 5/2005 | Leenders et al. |
| 7,393,474 B2 | * | 7/2008 | Park et al. ............ 252/500 |
| 2004/0067703 A1 | * | 4/2004 | Grunden et al. ............ 442/33 |
| 2005/0064198 A1 | * | 3/2005 | Takada et al. ............ 428/411.1 |
| 2006/0052509 A1 | * | 3/2006 | Saitoh ................. 524/496 |
| 2006/0062958 A1 | * | 3/2006 | Yoshida et al. ............ 428/64.4 |

FOREIGN PATENT DOCUMENTS

| DE | 196 27 071 | | 1/1998 |
| EP | 0 440 957 | | 3/1993 |
| EP | 0 564 911 | | 10/1993 |
| KR | 1020050017756 | * | 9/2006 |
| KR | 1020060024370 | * | 9/2007 |
| WO | WO 03/047853 | * | 6/2003 |

OTHER PUBLICATIONS

Wikipedia entry, "Melamine resins," http://en.wikipedia.org/wiki/Melamine_resin.*
STN Chemical Database Registry No. 9003-08-1.*
Groenendaal et al., "Poly(3,4-ethylenedioxythiophene) and Its Derivatives: Past, Present, and Future," *Advanced Materials*, 2000, pp. 481-494, vol. 12, No. 7.
Houben Weyl, Methoden der organischen Chemie, vol. E 20 Makromolekulare Stoff, part 2, (1987), p. 1141-1176.

* cited by examiner

*Primary Examiner*—Mark Kopec
*Assistant Examiner*—Jaison P Thomas
(74) *Attorney, Agent, or Firm*—Connolly Bove Lodge & Hutz LLP

(57) ABSTRACT

The present invention relates to coatings comprising electrically conductive polymers and melamine derivatives, their preparation and use, and dispersions for the preparation of such coatings.

12 Claims, No Drawings

POLYMER COATINGS HAVING IMPROVED RESISTANCE TO SOLVENTS

The present invention relates to coatings comprising electrically conductive polymers and melamine derivatives, their preparation and use, and dispersions for the preparation of such coatings.

Poly(3,4-alkylenedioxythiophene) dispersions for the preparation of conductive or antistatic coatings are known from the literature (see e.g. EP-A 440 957). Such dispersions are employed for the preparation of conductive or antistatic coatings. In practice, however, it has been found that the coatings from the dispersions are not always sufficiently stable for practical uses. In particular, the coatings are often not stable enough to solvents and/or mechanical stress.

Attempts have therefore been made to improve the resistance of the coatings to solvents and/or mechanical stress by addition of crosslinking agents, e.g. based on epoxysilane (see EP-A 564 911). However, in many cases this measure alone is not sufficient to adequately improve, in particular, the resistance to solvents.

There therefore continued to be a need for conductive or antistatic coatings having improved resistance to solvents compared with the known coatings, and for suitable dispersions for the preparation of such coatings.

The object of the present invention was therefore to provide such coatings having improved resistance to solvents, and suitable dispersions for the preparation thereof.

It has now been found, surprisingly, that dispersions comprising at least one conductive polymer and at least one melamine condensate are suitable for the preparation of coatings having such improved resistance to solvents. This is all the more surprising since it is known that the addition of polyamines to poly(3,4-alkylenedioxythiophene) dispersions conventionally leads to gelling and precipitation of the conductive polymer. However, such gelling is not observed in the case of the present invention.

The present invention thus provides a dispersion comprising at least one electrically conductive polymer, at least one counter-ion and at least one dispersing agent, characterized in that it comprises at least one condensate of melamine with at least one carbonyl compound.

Condensates of melamine with at least one carbonyl compound are preferably those of melamine and aldehydes or ketones. Suitable aldehydes or ketones are, for example, formaldehyde, acetaldehyde, butyraldehyde, acetone or methyl ethyl ketone. A particularly preferred aldehyde is formaldehyde; particularly preferred condensates of melamine with at least one carbonyl compound are melamine-formaldehyde condensates. Such particularly preferred melamine-formaldehyde condensates can be, for example, those of the general formula (II)

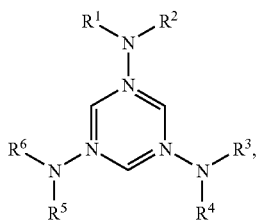

wherein
$R^1$ to $R^6$ independently of one another represent H or $CH_2$—$OR^7$, at least one of the radicals $R^1$ to $R^6$ being other than H, and
$R^7$ represent H or a linear or branched $C_1$-$C_8$-alkyl radical, preferably H or a linear or branched $C_1$-$C_4$-alkyl radical.

Very particularly preferably, the radicals $R^1$ to $R^6$ in such condensates of the general formula (II) all represent $CH_2$—$OR^7$.

Such particularly preferred melamine-formaldehyde condensates can furthermore be condensation products of the condensates of the general formula (II) with one another or with further melamine.

The particularly preferred melamine-formaldehyde condensates can moreover be partly or completely etherified. Moreover or alternatively, the particularly preferred melamine-formaldehyde condensates can be modified by reaction with amines, aminocarboxylic acids or sulfites, in order, for example, to increase the solubility in water, or by co-condensation with other compounds which are reactive towards aldehydes, such as, for example, phenols (melamine-phenol-formaldehyde resins) or ureas (melamine-urea-formaldehyde resins).

Suitable condensates of melamine with at least one carbonyl compound, in particular optionally modified and/or optionally partly or completely etherified melamine-formaldehyde condensates, are commercially obtainable.

The content of condensate of melamine with at least one carbonyl compound in the dispersion is 1 to 30 wt. %, based on the weight of the total dispersion. Preferably, the content of condensate of melamine with at least one carbonyl compound in the dispersion is 2 to 15 wt. %, based on the weight of the total dispersion.

Electrically conductive polymers here are understood as meaning, in particular, the compound class of π-conjugated polymers which have an electrical conductivity after oxidation or reduction. Preferably, conductive polymers are understood as meaning those π-conjugated polymers which have a specific conductivity of the order of at least 0.01 S cm$^{-1}$ in the dried state after oxidation.

Those dispersion wherein at least one conductive polymer is a polythiophene, polyaniline or polypyrrole are preferred in the context of the invention.

Particularly preferably, the electrically conductive polymer(s) is/are chosen from poly-alkylenedioxythiophenes containing recurring units of the general formula (I)

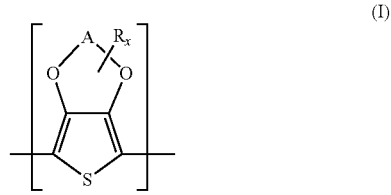

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and in the case where several radicals R are bonded to A, these can be identical or different.

The general formula (I) is to be understood as meaning that x substituents R can be bonded to the alkylene radical A.

Polythiophenes having recurring units of the general formula (I) wherein A represents an optionally substituted $C_2$-$C_3$-alkylene radical and x represents 0 or 1 are particularly preferred.

Very particularly preferably, at least one electrically conductive polymer is poly(3,4-ethylenedioxythiophene), which is optionally substituted.

In the context of the invention, the prefix poly- is to be understood as meaning that more than one identical or different recurring unit is contained in the polymer or polythiophene. The poly-thiophenes contain a total of n recurring units of the general formula (I), wherein n is an integer from 2 to 2,000, preferably 2 to 100. The recurring units of the general formula (I) can in each case be identical or different within a polythiophene. Polythiophenes having in each case identical recurring units of the general formula (I) are preferred.

The polythiophenes preferably in each case carry H on the end groups.

In preferred embodiments of the present invention, the dispersions comprise at least one polyalkylenedioxythiophene containing recurring units of the general formula (I) which, in the dried state, have a specific conductivity of the order of at least 0.05 S cm$^{-1}$, preferably of at least 0.5 S cm$^{-1}$.

In the context of the invention, $C_1$-$C_5$-alkylene radicals A are preferably methylene, ethylene, n-propylene, n-butylene or n-pentylene.

$C_1$-$C_4$-Alkyl preferably represents linear or branched $C_1$-$C_4$-alkyl radicals, such as methyl, ethyl, n- or iso-propyl or n-, iso-, sec- or tert-butyl, $C_1$-$C_8$-alkyl moreover represents, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, and $C_1$-$C_{18}$-alkyl moreover represents, for example, n-nonyl, n-decyl, n-undecyl, n-dodecyl, n-tridecyl, n-tridecyl, n-tetradecyl, n-hexadecyl or n-octadecyl.

In the context of the invention, $C_1$-$C_4$-hydroxyalkyl preferably represents a straight-chain, cyclic, branched or unbranched $C_1$-$C_4$-alkyl radical which is substituted by one or more, but preferably one hydroxyl group.

$C_5$-$C_{12}$-Cycloalkyl radicals R represent, for example, cyclopentyl, cyclohexyl, cycloheptyl, cyclooctyl, cyclononyl or cyclodecyl.

$C_5$-$C_{14}$-Aryl radicals R represent, for example, phenyl or naphthyl, and $C_7$-$C_{18}$-aralkyl radicals R represent, for example, benzyl, o-, m- or p-tolyl, 2,3-, 2,4-, 2,5-, 2,6-, 3,4- or 3,5-xylyl or mesityl. The above lists serve to explain the invention by way of example and are not to be regarded as conclusive.

In the context of the invention, possible optional further substituents of the radicals A and/or of the radicals R are numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic acid ester, carboxylic acid, carbonate, carboxylate, cyano, alkylsilane and alkoxysilane groups as well as carboxamide groups.

Possible substituents for polyaniline or polypyrrole are, for example, the radicals A and R listed above and/or the further substituents of the radicals A and R. Unsubstituted polyanilines and polypyrroles are preferred.

The scope of the invention includes all the radical definitions, parameters and explanations which are given above and listed in the following and are general or mentioned in preferred ranges among one another, that is to say also in any desired combination between the particular ranges and preferred ranges.

The polythiophenes employed as conductive polymers in the dispersions can be neutral or cationic. In preferred embodiments they are cationic, "cationic" relating only to the charges which sit on the polythiophene main chain. Depending on the substituent on the radicals R, the polythiophenes can carry positive and negative charges in the structural unit, the positive charges being on the polythiophene main chain and the negative charges optionally being on the radicals R substituted by sulfonate or carboxylate groups. In this context, the positive charges of the polythiophene main chain can be partly or completely satisfied by the anionic groups optionally present on the radicals R. Viewed overall, the polythiophenes can be cationic, neutral or even anionic in these cases. Nevertheless, in the context of the invention they are all regarded as cationic polythiophenes, since the positive charges on the polythiophene main chain are decisive. The positive charges are not shown in the formulae, since their precise number and position cannot be determined unambiguously. However, the number of positive charges is at least 1 and not more than n, where n is the total number of all the recurring units (identical or different) within the polythiophene.

To compensate the positive charge, if this is not already done by the optionally sulfonate- or carboxylate-substituted and therefore negatively charged radicals R, the cationic polythiophenes require anions as counter-anions.

Counter-ions can be monomeric or polymeric anions, the latter also being called polyanions in the following.

Polymeric anions are preferred to monomeric anions since they contribute towards the film formation, and due to their size lead to electrically conductive films which are more stable to heat.

However, the dispersions can also comprise monomeric anions, in addition to the polymeric anions.

Polymeric anions here can be, for example, anions of polymeric carboxylic acids, such as polyacrylic acids, polymethacrylic acids or polymaleic acids, or polymeric sulfonic acids, such as polystyrenesulfonic acids and polyvinylsulfonic acids. These polycarboxylic and -sulfonic acids can also be copolymers of vinylcarboxylic and vinylsulfonic acids with other polymerizable monomers, such as acrylic acid esters and styrene.

Preferably, at least one anion of a polymeric carboxylic or sulfonic acid is contained as the counter-ion in the dispersions according to the invention.

The anion of polystyrenesulfonic acid (PSS) is particularly preferred as the polymeric anion.

The molecular weight of the polyacids which supply the polyanions is preferably 1,000 to 2,000,000, particularly preferably 2,000 to 500,000. The polyacids or their alkali metal salts are commercially obtainable, e.g. polystyrenesulfonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

The dispersion can comprise the polymeric anion(s) and electrically conductive polymers in particular in a weight ratio of from 0.5:1 to 50:1, preferably from 1:1 to 30:1, particularly preferably 2:1 to 20:1. The weight of the electrically conductive polymers corresponds here to the weight of the monomers employed, assuming that complete conversion takes place during the polymerization.

Anions which serve as monomeric anions are, for example, those of $C_1$-$C_{20}$-alkanesulfonic acids, such as methane-, ethane-, propane-, butane- or higher sulfonic acids, such as dodecanesulfonic acid, of aliphatic perfluorosulfonic acids, such as trifluoromethanesulfonic acid, perfluorobutanesulfonic acid or perfluorooctanesulfonic, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids, such as camphorsulfonic acid, or tetrafluoroborates, hexafluorophosphates, perchlorates, hexafluoroantimonates, hexafluoroarsenates or hexachloroantimonates.

The anions of p-toluenesulfonic acid, methanesulfonic acid or camphorsulfonic acid are preferred as monomeric anions.

Cationic polythiophenes which contain anions as counterions for charge compensation are often also called polythiophene/(poly)anion complexes by persons skilled in the art.

The total content of the electrically conductive polymer and counter-ion, for example in the form of such polymer/counter-ion complexes, in the dispersion according to the invention is, for example, between 0.05 and 10 wt. %, preferably 0.1 and 2 wt. %, based on the total weight of the dispersion.

The dispersions according to the invention can comprise one or more dispersing agents. The following solvents may be mentioned as dispersing agents by way of example: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulfoxides and sulfones, such as dimethylsulfoxide and sulfolane; aliphatic carboxylic acid amides, such as methylacetamide, dimethylacetamide and dimethylformamide; and aliphatic and araliphatic ethers, such as diethyl ether and anisole. Water or a mixture of water with the above-mentioned organic solvents can furthermore also be used as the dispersing agent.

Preferred dispersing agents are water or other protic solvents, such as alcohols, e.g. methanol, ethanol, i-propanol and butanol, and mixtures of water with these alcohols, water being the particularly preferred solvent.

The dispersion can moreover comprise further components, such as surface-active substances, e.g. ionic and non-ionic surfactants or adhesion promoters, such as e.g. organo-functional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane.

The dispersions according to the invention can comprise further additives which increase the conductivity, such as e.g. compounds containing ether groups, such as e.g. tetrahydrofuran, compounds containing lactone groups, such as γ-butyrolactone and γ-valerolactone, compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone and pyrrolidone, sulfones and sulfoxides, such as e.g. sulfolane (tetramethylene sulfone) and dimethylsulfoxide (DMSO), sugars or sugar derivatives, such as e.g. sucrose, glucose, fructose and lactose, sugar alcohols, such as e.g. sorbitol and mannitol, furan derivatives, such as e.g. 2-furancarboxylic acid and 3-furancarboxylic acid, and/or di- or polyalcohols, such as e.g. ethylene glycol, glycerol and di- and triethylene glycol. Tetrahydrofuran, N-methylformamide, N-methylpyrrolidone, ethylene glycol, dimethylsulfoxide or sorbitol are particularly preferably employed as conductivity-increasing additives.

The dispersions according to the invention can moreover comprise one or more organic binders which are soluble in organic solvents or water-soluble, such as polyvinyl acetate, polycarbonate, polyvinylbutyral, polyacrylic acid esters, polyacrylamides, polymethacrylic acid esters, polymethacrylamides, polystyrene, polyacrylonitrile, polyvinyl chloride, polyvinylpyrrolidones, polybutadiene, polyisoprene, polyethers, polyesters, polyurethanes, polyamides, polyimides, polysulfones, silicones, epoxy resins, styrene/acrylic acid ester, vinyl acetate/acrylic acid ester and ethylene/vinyl acetate copolymers, polyvinyl alcohols or celluloses.

The content of polymeric binder in the dispersion according to the invention is 0.1-90 wt. %, preferably 0.5-30 wt. % and very particularly preferably 0.5-10 wt. %, based on the total weight of the dispersion.

Such an organic binder optionally contained in the dispersion can optionally also function as a dispersing agent if this is liquid at the stated temperature.

The dispersions according to the invention can have a pH of from 1 to 14, and a pH of from 1 to 8 is preferred.

Bases or acids, for example, can be added to the dispersions to adjust the pH. Those additives which do not impair the film formation of the dispersions and are not volatile at higher temperatures, e.g. soldering temperatures, are preferred, such as e.g. the bases 2-(dimethylamino)-ethanol, 2,2'-iminodiethanol or 2,2',2"-nitrilotriethanol and the acid polystyrenesulfonic acid.

The viscosity of the dispersion according to the invention can be between 0.1 and 100,000 mPa·s (measured at 20° C. and a shear rate of 100 s$^{-1}$), depending on the application method. Preferably, the viscosity is 1 to 10,000 mPa·s, particularly preferably between 10 to 1,000 mPa·s.

The preparation of the dispersions according to the invention is carried out by first preparing dispersions of electrically conductive polymers in the presence of counter-ions from the corresponding precursors for the preparation of conductive polymers, for example analogously to the conditions mentioned in EP-A 440 957. An improved variant for the preparation of the dispersions is the use of an ion exchanger for removal of the inorganic salt content or a part thereof. Such a variant is described, for example, in DE-A 196 27 071. The ion exchanger can be stirred with the product, for example, or the product is conveyed over a column packed with an ion exchanger column. By using the ion exchanger, for example, low metal contents can be achieved.

The particle size of the particles in the dispersion can be reduced, for example, by means of a high pressure homogenizer after the desalination. This operation can also be repeated in order to increase the effect. In this context, particularly high pressures of between 100 and 2,000 bar have proved advantageous for greatly reducing the particle size.

A preparation of the polyaniline/polyanion, polypyrrole/polyanion or polythiophene/polyanion complex and subsequent dispersion or redispersion in one or more dispersing agent(s) is also possible.

The solids content of the particles of the electrically conductive polymer/counter-ion complex in these dispersions is, for example, 0.1 to 90 wt. %, preferably 0.5 to 30 wt. % and very particularly preferably 0.5 to 10 wt. %, based on the total weight of the dispersion.

For the preparation of the dispersions according to the invention, the further components, such as, for example, the condensate of melamine with at least one carbonyl compound, optionally further dispersing agent and optionally further additives, organic binders etc., are then added to these dispersions, and mixed, for example with stirring.

Corresponding monomers, for example, are understood as precursors for the preparation of conductive polymers, also called precursors in the following. It is also possible for mixture of various precursors to be used. Suitable monomeric precursors are, for example, optionally substituted thiophenes, pyrroles or anilines, preferably optionally substituted thiophenes, particularly preferably optionally substituted 3,4-alkylenedioxythiophenes.

Examples which may be mentioned of substituted 3,4-alkylenedioxythiophenes are the compounds of the general formula (III)

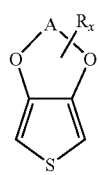

(III)

wherein
A represents an optionally substituted $C_1$-$C_5$-alkylene radical, preferably an optionally substituted $C_2$-$C_3$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8, preferably represents 0 or 1, and in the case where several radicals R are bonded to A, these can be identical or different.

Very particularly preferred monomeric precursors are optionally substituted 3,4-ethylenedioxythiophenes, and in preferred embodiments unsubstituted 3,4-ethylenedioxythiophene.

Possible substituents for the abovementioned precursors, in particular for the thiophenes, preferably for the 3,4-alkylenedioxythiophenes, are the radicals mentioned for R for the general formula (III).

Possible substituents for pyrroles and anilines are, for example, the abovementioned radicals A and R and/or the further substituents of the radicals A and R.

Possible optional further substituents of the radicals A and/or of the radicals R are the organic groups mentioned in connection with the general formula (I).

Processes for the preparation of the monomeric precursors for the preparation of conductive polymers are known to the person skilled in the art and are described, for example, in L. Groenendaal, F. Jonas, D. Freitag, H. Pielartzik & J. R. Reynolds, Adv. Mater. 12 (2000) 481-494 and literature cited therein.

The dispersions according to the invention are outstandingly suitable for the preparation of electrically conductive or antistatic coatings.

The present invention thus also provide electrically conductive or antistatic coatings which are obtainable from the dispersions according to the invention.

For the preparation of the coatings according to the invention, the dispersions according to the invention, for example, are applied by known processes, e.g. by spincoating, impregnation, pouring, dripping on, spraying, misting on, knife-coating on, brushing or printing, for example ink-jet, screen, gravure, offset or pad printing, to a suitable substrate in a wet film thickness of from 0.5 μm to 250 μm, preferably in a wet film thickness of from 2 μm to 50 μm, and then dried at least at a temperature of from 20° C. to 200° C.

The coatings according to the invention are surprisingly more resistant in particular to organic solvents than coatings which are already known from the prior art.

The following examples serve to explain the invention by way of example and are not to be interpreted as a limitation.

EXAMPLES

1.) Preparation of Dispersions According to the Invention

Example 1

A dispersion was prepared from
52.6 g Baytron® P (H.C.Starck GmbH, Leverkusen)
0.3 g 2-(dimethylamino)-ethanol
31.4 g NeoRez R 9603 (polyurethane dispersion; DSM Neo Resins, Waalwijk, Netherlands)
10.5 g Acrafix® ML (partly etherified, modified melamine-formaldehyde condensate, Lanxess Deutschland GmbH)
2.0 g isopropyl alcohol
3.1 g N-methylpyrrolidone
0.1 g Dynol™ 604 (wetting agent, Air Products)
by mixing, with stirring, in the stated sequence.

Example 2

A dispersion was prepared from
52.6 g Baytron® P (H.C.Starck GmbH, Leverkusen)
0.3 g 2-(dimethylamino)-ethanol
31.4 g NeoRez R 9603 (polyurethane dispersion; DSM Neo Resins, Waalwijk, Netherlands)
6.2 g Maprenal® MF 921 W (partly etherified, modified melamine-formaldehyde condensate, Solutia)
2.0 g isopropyl alcohol
3.1 g N-methylpyrrolidone
0.1 g Dynol™ 604 (wetting agent, Air Products)
by mixing, with stirring, in the stated sequence.

Example 3

A dispersion was prepared from
52.6 g Baytron® P (H.C.Starck GmbH, Leverkusen)
0.3 g 2-(dimethylamino)-ethanol 31.4 g NeoRez R 9603 (polyurethane dispersion; DSM Neo Resins, Waalwijk, Netherlands)
7.5 g Setamine® MS-152 (modified melamine-formaldehyde condensate, Nuplex Resins)
2.0 g isopropyl alcohol
3.1 g N-methylpyrrolidone
0.1 g Dynol™ 604 (wetting agent, Air Products)
by mixing, with stirring, in the stated sequence.

Comparison Example 1 (according to EP-A 564 911)

A dispersion was prepared from
42.9 g Baytron® P (H.C.Starck GmbH, Leverkusen)
4.0 g dimethylsulfoxide
0.9 g Silquest® A 187=glycidoxypropyltrimethoxysilane
52.2 g isopropyl alcohol
by mixing, with stirring, in the stated sequence.

Comparison Example 2

A dispersion was prepared from
52.6 g Baytron® P (H.C.Starck GmbH, Leverkusen)
0.3 g 2-(dimethylamino)-ethanol
31.4 g NeoRez R 9603 (polyurethane dispersion; DSM Neo Resins, Waalwijk, Netherlands)
5.25 g melamine
2.0 g isopropyl alcohol
3.1 g N-methylpyrrolidone
0.1 g Dynol® 604 (wetting agent, Air Products)
by mixing, with stirring, in the stated sequence.

2.) Preparation of Coatings According to the Invention

Example 4

The dispersions of Comparison Examples 1 and 2 and of Examples 1 to 3 according to the invention were knife-coated in a wet film thickness of 18 μm on to a 175 μm thick polyester film using a handcoater and were then dried at 130° C. for 5 minutes.

The surface resistance of the coating was then measured in accordance with ASTM and the resistance of the coatings to solvents is determined by rubbing with a cloth containing solvent.

The results were summarized in the following tables:
+=resistant to solvents, the layer is not destroyed
−=not resistant to solvents, the layer is destroyed

TABLE 1

Surface resistance of the coatings from Examples 1 to 3 and Comparison Examples 1 and 2

| | Examples according to the invention | | | Comparison examples | |
|---|---|---|---|---|---|
| | 1 | 2 | 3 | 4 | 5 |
| Surface resistance [Ω/sq.] | $2 \times 10^6$ | $9 \times 10^6$ | $8 \times 10^6$ | $2 \times 10^3$ | $8 \times 10^6$ |

TABLE 2

Resistance of the coatings from Examples 1 to 3 and Comparison Examples 1 and 2 to solvents

| | Examples according to the invention | | | Comparison examples | |
|---|---|---|---|---|---|
| Solvent | 1 | 2 | 3 | 4 | 5 |
| Toluene | + | + | + | − | − |
| Acetone | + | + | + | − | − |
| Methyl ethyl ketone (MEK) | + | + | + | − | − |
| Ethanol | + | + | + | − | + |
| Ethyl acetate | + | + | + | − | − |
| Dimethylformamide | + | + | + | − | − |
| NaOH (10% strength in water) | + | + | + | − | − |
| N-Methylpyrrolidone | + | + | + | − | − |
| Dimethylsulfoxide | + | + | + | − | − |
| Water | + | + | + | − | + |

The results clearly show the higher resistance to solvents of the coatings according to the invention which were prepared using the dispersions according to the invention compared with the coatings which were prepared with the dispersions of the comparison examples.

The invention claimed is:

1. A dispersion comprising:
at least one electrically conductive polymer selected from the group consisting of polyalkylenedioxythiophenes containing recurring units of the general formula (I)

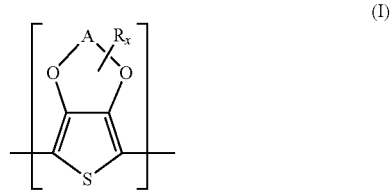

wherein A represents an optionally substituted $C_1$-$C_5$-alkylene radical, R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different,
at least one counter-ion selected from the group consisting of anions of polymeric carboxylic acids or sulfonic acids or monomeric $C_1$-$C_{20}$-alkanesulfonic acids, aliphatic $C_1$-$C_{20}$-perfluorosulfonic acids, aliphatic $C_1$-$C_{20}$-carboxylic acids, aliphatic $C_1$-$C_{20}$-perfluorocarboxylic acids, aromatic $C_1$-$C_{20}$-sulfonic acids optionally substituted by $C_1$-$C_{20}$-alkyl groups, optionally substituted $C_1$-$C_{20}$-cycloalkanesulfonic acids or tetrafluoroborates, hexafluorophosphates, perchlorates, hexafluoroantimonates, hexafluoroarsenates or hexachloroantimonates,
at least one base, and
at least one dispersing agent, characterized in that it comprises at least one condensate of melamine with at least one carbonyl compound,
wherein the total amount of the at least one electrically conductive polymer and at least one counter-ion in the dispersion is between 0.05 and 10 wt. %, based on the total weight of the dispersion and wherein the total content of the at least one condensate of melamine and at least one carbonyl compound is 1 to 30 wt. % based on the weight of the dispersion.

2. The dispersion according to claim 1, wherein said at least one conductive polymer is poly(3,4-ethylenedioxythiophene).

3. The dispersion according to claim 2, wherein said at least one counter-ion is the anion of polystyrenesulfonic acid.

4. The dispersion according to claim 3, wherein the condensate(s) of melamine with at least one carbonyl compound is/are optionally modified and/or optionally partly or completely etherified melamine-formaldehyde condensates.

5. The dispersion according to claim 4, wherein the dispersion comprises at least one polymeric organic binder.

6. The dispersion according to claim 1, wherein said at least one counter-ion is the anion of polystyrenesulfonic acid.

7. The dispersion according to claim 1, wherein the condensate(s) of melamine with at least one carbonyl compound is/are-optionally modified and/or optionally partly or completely etherified melamine-formaldehyde condensates.

8. The dispersion according to claim 1, wherein the dispersion comprises at least one polymeric organic binder.

9. The dispersion according to claim 1, wherein the dispersion comprises water, aliphatic alcohols, aliphatic ketones, aliphatic carboxylic acid esters, aromatic hydrocarbons, aliphatic hydrocarbons, chlorohydrocarbons, aliphatic nitriles, aliphatic sulfoxides and sulfones, aliphatic carboxylic acid amides, aliphatic and araliphatic ethers or mixtures of at least two of the abovementioned substances as dispersing agents.

10. Method for the preparation of electrically conductive or antistatic coatings comprising using the dispersions according to claim 1.

11. Electrically conductive or antistatic coating obtainable from dispersions according to claim 1.

12. The dispersion according to claim 1, wherein the at least one base comprises one or more compounds selected from the group consisting of 2-(dimethylamino)-ethanol, 2,2'-iminodiethanol and 2,2',2"-nitrilotriethanol, and mixtures thereof.

* * * * *

UNITED STATES PATENT AND TRADEMARK OFFICE
CERTIFICATE OF CORRECTION

PATENT NO. : 7,785,493 B2
APPLICATION NO. : 11/593205
DATED : August 31, 2010
INVENTOR(S) : Friedrich Jonas et al.

Page 1 of 1

It is certified that error appears in the above-identified patent and that said Letters Patent is hereby corrected as shown below:

In the Specification, at column 1, lines 55-67, delete

" 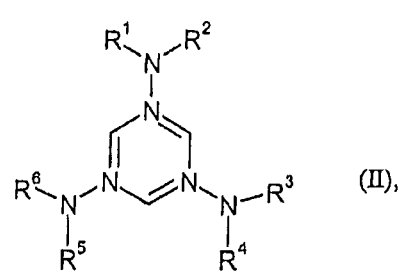 "

and insert:

-- 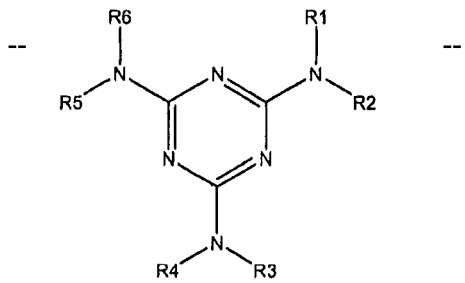 --

Signed and Sealed this

Second Day of November, 2010

David J. Kappos
*Director of the United States Patent and Trademark Office*